(12) United States Patent
Kim et al.

(10) Patent No.: US 11,078,985 B2
(45) Date of Patent: Aug. 3, 2021

(54) COMPRESSOR MOUNTING DEVICE FOR VEHICLE

(71) Applicants: Hyundai Motor Company, Seoul (KR); Kia Motors Corporation, Seoul (KR)

(72) Inventors: Yeon Ho Kim, Seoul (KR); Jae Yeon Kim, Hwaseong-si (KR); Wan Je Cho, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 75 days.

(21) Appl. No.: 16/685,342

(22) Filed: Nov. 15, 2019

(65) Prior Publication Data

US 2021/0071735 A1 Mar. 11, 2021

(30) Foreign Application Priority Data

Sep. 5, 2019 (KR) .......................... 10-2019-0110056

(51) Int. Cl.
| | |
|---|---|
| *F16F 15/08* | (2006.01) |
| *B60H 1/32* | (2006.01) |
| *F16M 13/02* | (2006.01) |
| *B60H 1/00* | (2006.01) |

(52) U.S. Cl.
CPC .......... *F16F 15/08* (2013.01); *B60H 1/3229* (2013.01); *F16M 13/02* (2013.01); *B60H 2001/006* (2013.01)

(58) Field of Classification Search
CPC .. F16F 15/08; B60H 1/3229; B60H 2001/006

USPC ................................. 248/634, 638, 674, 635
See application file for complete search history.

(56) References Cited

U.S. PATENT DOCUMENTS

| | | | | |
|---|---|---|---|---|
| 1,526,882 | A * | 2/1925 | Trimmer ................... | H02K 5/24 248/635 |
| 4,713,714 | A * | 12/1987 | Gatti ....................... | G11B 33/08 248/581 |
| 4,984,971 | A * | 1/1991 | Bergeron .............. | F04B 39/127 248/621 |

(Continued)

FOREIGN PATENT DOCUMENTS

| | | |
|---|---|---|
| KR | 2019950017499 Y1 | 7/1995 |
| KR | 1019970045879 A | 7/1997 |

(Continued)

*Primary Examiner* — Bradley Duckworth
(74) *Attorney, Agent, or Firm* — Slater Matsil, LLP

(57) ABSTRACT

A compressor mounting device can be used for mounting a compressor to a vehicle body frame. The compressor mounting device includes a main body to be mounted to the vehicle body frame through first and second frame mounting units integrally formed to one end and the other end and including first and second compressor mounting units formed to be protruded upwardly between the first and second frame mounting units so as to be mounted to first and second lugs formed in the compressor. A main bush unit is mounted to the first and second compressor mounting units and connects the compressor and the first and second compressor mounting units through the first and second lugs to lessen vibration generated from the compressor from being transmitted to the vehicle body frame through the main body.

20 Claims, 11 Drawing Sheets

(56) References Cited

U.S. PATENT DOCUMENTS

| | | | | |
|---|---|---|---|---|
| 5,306,121 | A * | 4/1994 | Heflin | F04B 39/0044 |
| | | | | 248/638 |
| 5,524,860 | A * | 6/1996 | Ives | F04B 39/12 |
| | | | | 248/674 |
| 7,510,163 | B2 * | 3/2009 | Schlitzkus | B60T 8/3685 |
| | | | | 248/548 |
| 8,794,584 | B2 * | 8/2014 | Shimada | F16M 13/02 |
| | | | | 248/635 |
| 8,821,092 | B2 * | 9/2014 | Nambara | F16B 5/0258 |
| | | | | 411/166 |
| 9,303,718 | B2 * | 4/2016 | Long | F16F 15/08 |
| 10,577,024 | B2 * | 3/2020 | Flickinger | F16F 1/3732 |
| 2015/0159805 | A1 * | 6/2015 | Lee | F04D 29/669 |
| | | | | 248/634 |

FOREIGN PATENT DOCUMENTS

| KR | 2019980021583 U | 7/1998 |
|---|---|---|
| KR | 2019980032764 U | 9/1998 |
| KR | 100980881 B1 | 9/2010 |

* cited by examiner (D1 > D2)

FIG. 7
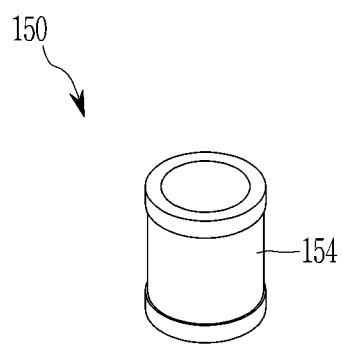
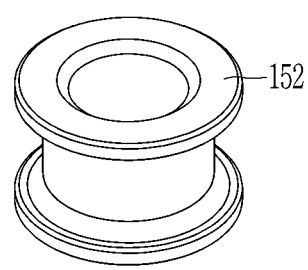

(D1 > D2)

COMPRESSOR MOUNTING DEVICE FOR VEHICLE

CROSS-REFERENCE TO RELATED APPLICATIONS

This application claims priority to Korean Patent Application No. 10-2019-0110056, filed in the Korean Intellectual Property Office on Sep. 5, 2019, which application is hereby incorporated herein by reference.

TECHNICAL FIELD

The present invention relates to a compressor mounting device for a vehicle.

BACKGROUND

Generally, an air condition system for a vehicle includes an air conditioner device circulating a refrigerant in order to heat or cool an interior of the vehicle.

The air conditioner device, which is used to maintain the interior of the vehicle at an appropriate temperature regardless of a change in an external temperature to maintain a comfortable interior environment, is configured to heat or cool the interior of the vehicle by heat exchange by an evaporator in a process in which a refrigerant discharged by driving of a compressor is circulated to the compressor through a condenser, a receiver drier, an expansion valve, and the evaporator.

That is, the air conditioner device lowers the temperature and humidity of the interior by condensing a high-temperature high-pressure gas-phase refrigerant compressed from the compressor by the condenser, passing the refrigerant through the receiver drier and the expansion valve, and then evaporating the refrigerant in the evaporator in a cooling mode in summer.

Here, the compressor is mounted via a separate mounting bracket to the frame of the vehicle body inside the engine compartment of the vehicle.

However, the conventional compressor as described above may be damaged or deteriorated by external vibration transmitted directly to the frame when the vehicle is running, during operation of the compressor, and since noise and vibration generated from the compressor are transmitted directly to the vehicle body through the frame, there are problems that durability of the compressor is deteriorated and NVH performance of the vehicle is deteriorated.

In addition, in order to insulate the external vibration and its own noise and vibration while ensuring the durability of the compressor in the related art, since a plurality of brackets are applied between the vehicle body and the compressor and a plurality of insulating members are mounted on each bracket so as to have a double or triple support structure, manufacturing cost increases and weight increases due to an increase of the number of constituent elements.

The above information disclosed in this Background section is only for enhancement of understanding of the background of the invention and therefore it may contain information that does not form the prior art that is already known in this country to a person of ordinary skill in the art.

SUMMARY

The present invention relates to a compressor mounting device for a vehicle. Particular embodiments of the present invention relate to a compressor mounting device for a vehicle for stably mounting a compressor to a frame of the vehicle and minimizing vibration generated from the compressor to a vehicle body.

Embodiments of the present invention can solve the problems such as those listed above. For example, a compressor mounting device for a vehicle can improve overall NVH performance of a vehicle through securing impact absorption and vibration insulation performance by stably mounting a compressor on the frame of the vehicle and absorbing the external impact to protect the compressor, and simultaneously minimizing the vibration generated from the compressor from being transmitted to the vehicle body.

A compressor mounting device for a vehicle according to an exemplary embodiment of the present invention for mounting a compressor to a vehicle body frame includes a main body mounted to the vehicle body frame through first and second frame mounting units integrally formed to one end and the other end and including first and second compressor mounting units formed to be protruded upwardly between the first and second frame mounting units so as to be mounted to first and second lugs formed in the compressor. A main bush unit is mounted to the first and second compressor mounting units and connects the compressor and the first and second compressor mounting units through the first and second lugs to minimize vibration generated from the compressor from being transmitted to the vehicle body frame through the main body. A sub-bush unit is mounted to the first and second frame mounting units or the vehicle body frame and connects the vehicle body frame and the main body to reduce an impact transmitted from the vehicle body frame to the compressor through the main body.

The first frame mounting unit may extend toward both sides in a width direction from one end with respect to a length direction of the main body, and a first bush hole may be respectively formed at both extended side ends of the first frame mounting unit to mount the sub-bush unit.

In the second frame mounting unit, a second bush hole may be formed to mount the sub-bush unit.

The first compressor mounting unit may be disposed at a position close to the first frame mounting unit between the first frame mounting unit and the second frame mounting unit with respect to the length direction of the main body, and the second compressor mounting unit may be disposed at a position close to the second frame mounting unit with respect to the length direction of the main body.

The first compressor mounting unit may include: a first bending part respectively formed to be bent upwardly from both sides with respect to the width direction of the main body; and a second bending part formed to be bent from the first bending part toward the outside in the width direction of the main body.

In the second bending part and the second compressor mounting unit, third and fourth bush holes may be respectively formed to mount the main bush unit.

The first compressor mounting unit may be formed in the main body at a position corresponding to a center of gravity of the compressor and disposed on the same line as a first imaginary line passing through the center of gravity in the width direction.

The second compressor mounting unit may be disposed on the same line as a second imaginary line passing through a center of gravity of the compressor and a rotation axis of the compressor.

The second frame mounting unit may be disposed on the same line as the second imaginary line.

The first compressor mounting unit may be disposed above the second compressor mounting unit with respect to the lower surface of the main body.

In the main body, at least one opening hole may be formed along the length direction.

The main bush unit may include an outer ring mounted to the first and second compressor mounting unit, a first insulator with the exterior circumference vulcanized-bonded to the interior circumference of the outer ring, and an inner stud with the exterior circumference vulcanized-bonded to the center of the first insulator and engaged to the first or second lug.

The inner stud may include a first washer part with an upper surface supported by a lower end of the first or second lug and formed to have a predetermined interval from the upper surface of the first insulator, a second washer part formed to have a predetermined interval from the lower surface of the first insulator at a position separated downwardly from the first washer part, and at least one protrusion part formed between the first washer part and the second washer part to increase a contact area with the interior circumference of the first insulator.

The second washer part may be formed with a wider area than the first washer part corresponding to a size of the first insulator.

The sub-bush unit may include a second insulator mounted to first and second frame mounting units and an inner ring with an exterior circumference vulcanized-bonded to an interior circumference of the second insulator.

The first insulator and the second insulator may be formed with different elastic coefficients.

The first insulator may be formed with a lower elastic coefficient than that of the second insulator.

The main body may be formed with a "T" shape through the first frame mounting unit.

The first frame mounting unit may be mounted through a bracket provided on the vehicle body frame.

A compressor mounting device for a vehicle according to another exemplary embodiment of the present invention includes a main body mounted to the vehicle body frame through first and second frame mounting units integrally formed to one end and the other end and including first and second compressor mounting units formed to be protruded upwardly between the first and second frame mounting units so as to be mounted to first and second lugs formed in the compressor. A main bush unit is mounted to the first and second lugs and connects the compressor and the first and second compressor mounting units to minimize a vibration generated from the compressor from being transmitted to the vehicle body frame through the main body. A sub-bush unit is mounted to the first and second frame mounting units or the vehicle body frame and connects the vehicle body frame and the main body to reduce an impact transmitted from the vehicle body frame to the compressor through the main body.

As above-described, according to the compressor mounting device for the vehicle according to an exemplary embodiment of the present invention, the compressor is stably mounted on the vehicle body frame and the external impact is absorbed, thereby protecting the compressor, and simultaneously the transmission of the vibration generated from the compressor to the vehicle body may be minimized, and resultantly the overall NVH performance of the vehicle may be improved by securing the impact absorption and the vibration insulation performance.

Also, the present invention mounts the compressor to the vehicle body frame by using the main bush unit connected to the compressor, the sub-bush unit connected to the vehicle body frame, and one main body, thereby reducing the manufacturing cost and the weight by minimizing the number of constituent elements.

BRIEF DESCRIPTION OF THE DRAWINGS

FIG. 7 is an exploded perspective view of a sub-bush unit applied to a compressor mounting device for a vehicle according to an exemplary embodiment of the present invention.

Figure 1:
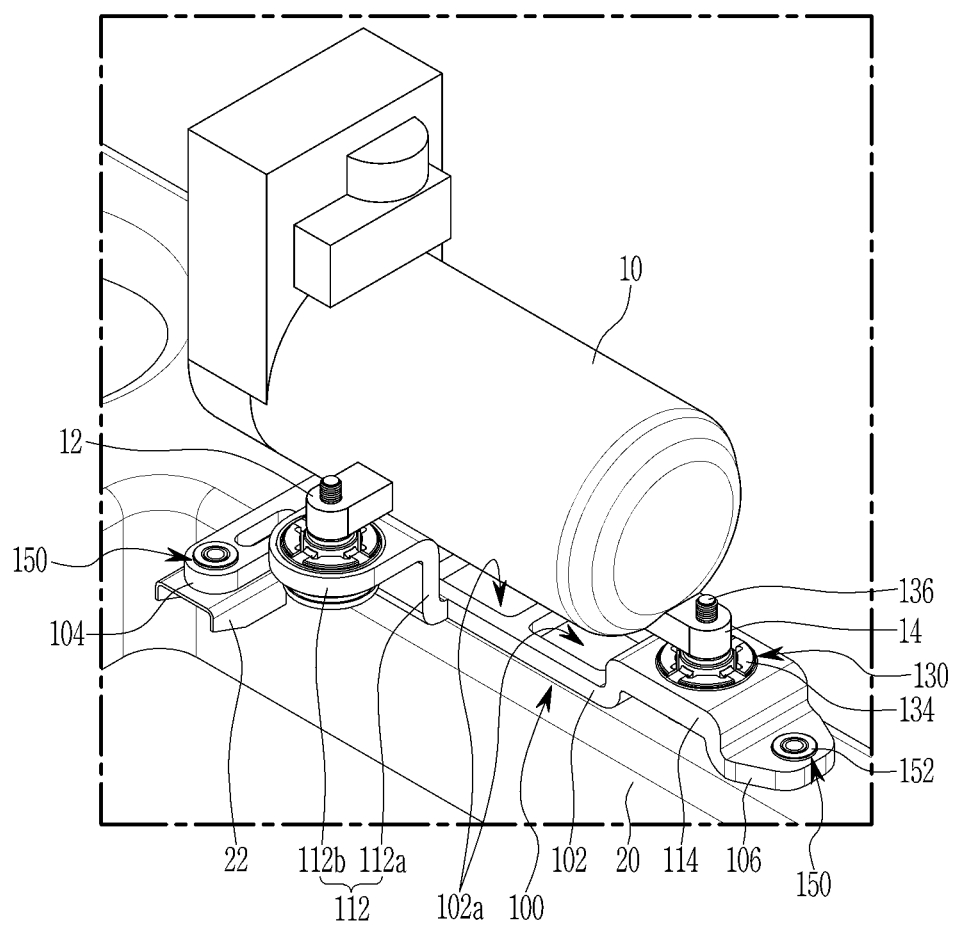
FIG. 1 and FIG. 2 are a perspective view and a lateral view showing a compressor mounted on a vehicle body frame by using a compressor mounting device for a vehicle according to an exemplary embodiment of the present invention, respectively.

The following reference numerals can be used in conjunction with the drawings:

10: compressor
12, 14: first and second lugs
20: vehicle body frame
100, 200: compressor mounting device
102, 202: main body
104, 204: first frame mounting unit
106, 206: second frame mounting unit
112, 212: first compressor mounting unit
114, 214: second compressor mounting unit
130, 230: main bush unit
150, 250: sub-bush unit

DETAILED DESCRIPTION OF ILLUSTRATIVE EMBODIMENTS

An exemplary embodiment of the present invention will hereinafter be described in detail with reference to the accompanying drawings.

Exemplary embodiments described in the present specification and configurations shown in the drawings are just the most preferable exemplary embodiments of the present invention, and do not limit the spirit and scope of the present invention. Therefore, it should be understood that there may be various equivalents and modifications capable of replacing them at the time of filing of the present application.

In order to clarify the present invention, parts that are not connected with the description will be omitted, and the same elements or equivalents are referred to by the same reference numerals throughout the specification.

The size and thickness of each element are arbitrarily shown in the drawings, but the present invention is not necessarily limited thereto, and in the drawings, the thickness of layers, films, panels, regions, etc., are exaggerated for clarity.

Throughout this specification and the claims which follow, unless explicitly described to the contrary, the word "comprise" or variations such as "comprises" or "comprising" will be understood to imply the inclusion of stated elements but not the exclusion of any other elements.

Further, the terms " . . . unit", " . . . mechanism", " . . . portion", " . . . member", etc. used herein mean a unit of inclusive components performing at least one or more functions or operations.

Figure 2:
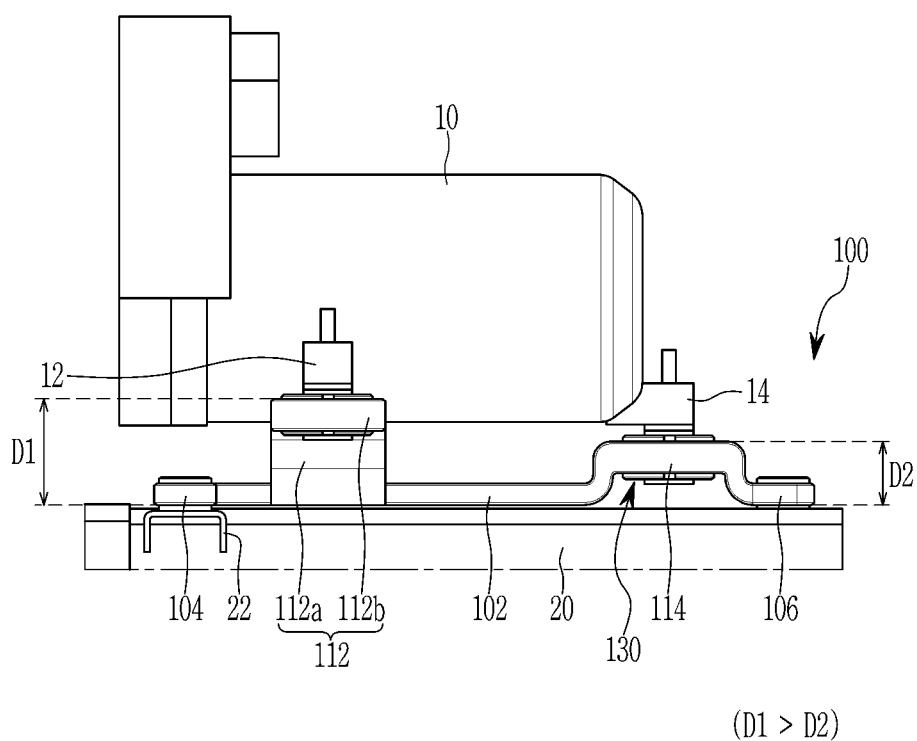
Figure 3:
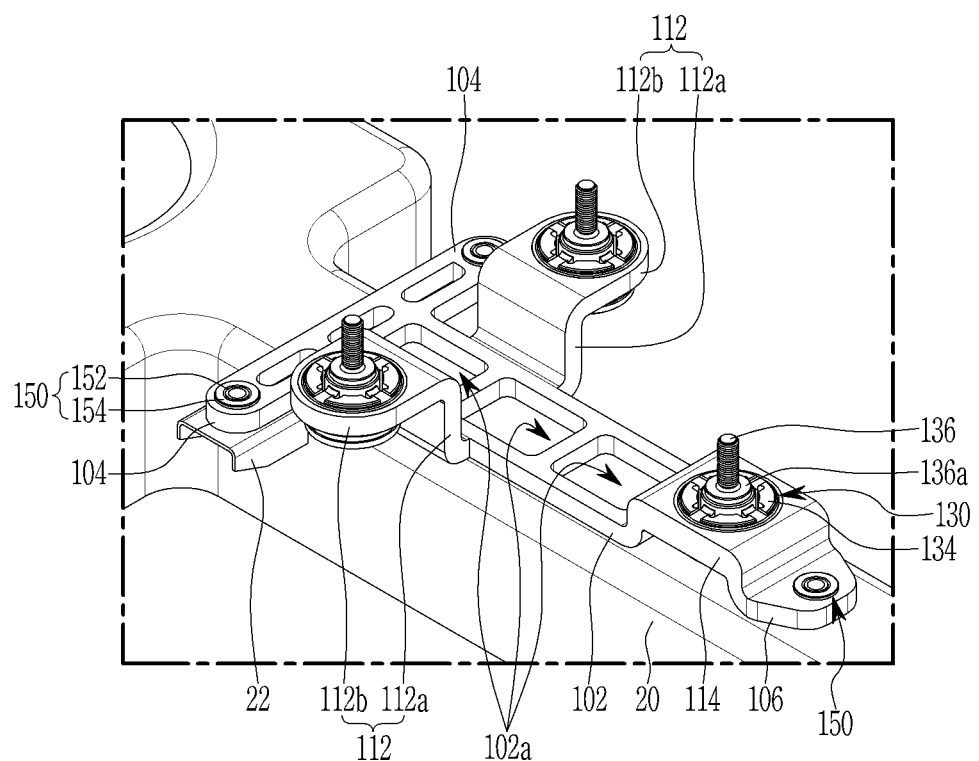
FIG. 3 is a perspective view of a compressor mounting device for a vehicle according to an exemplary embodiment of the present invention.
Figure 4:
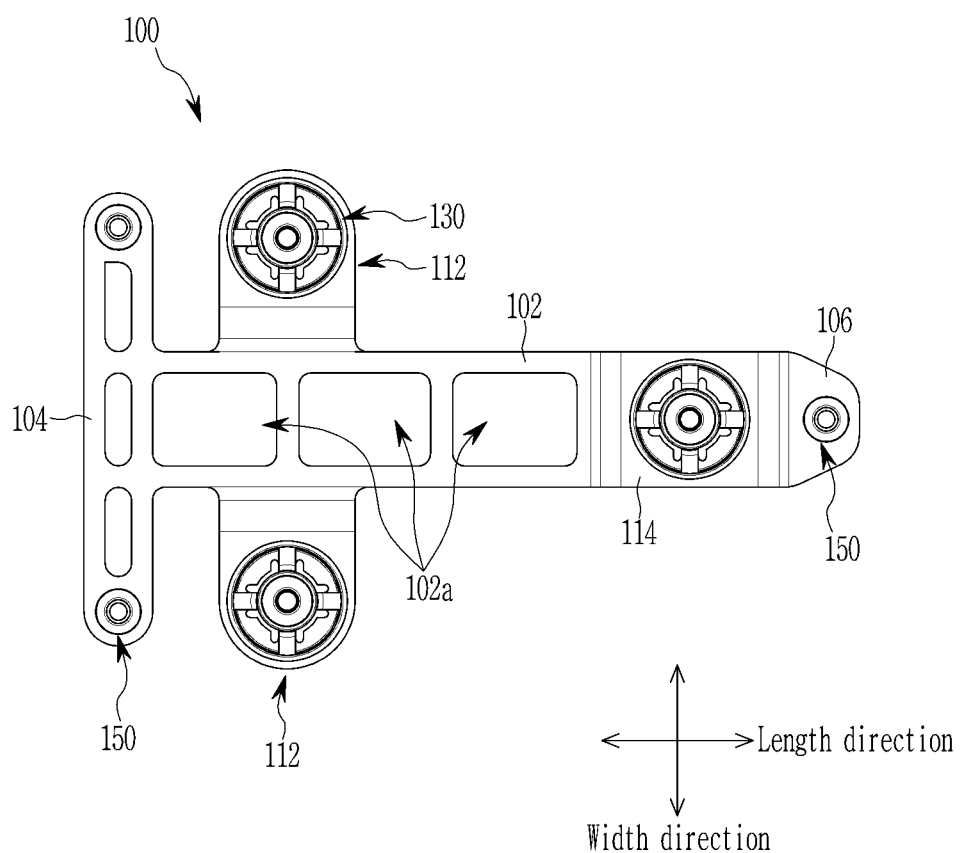
FIG. 4 is a top plan view of a compressor mounting device for a vehicle according to an exemplary embodiment of the present invention.
Figure 5:
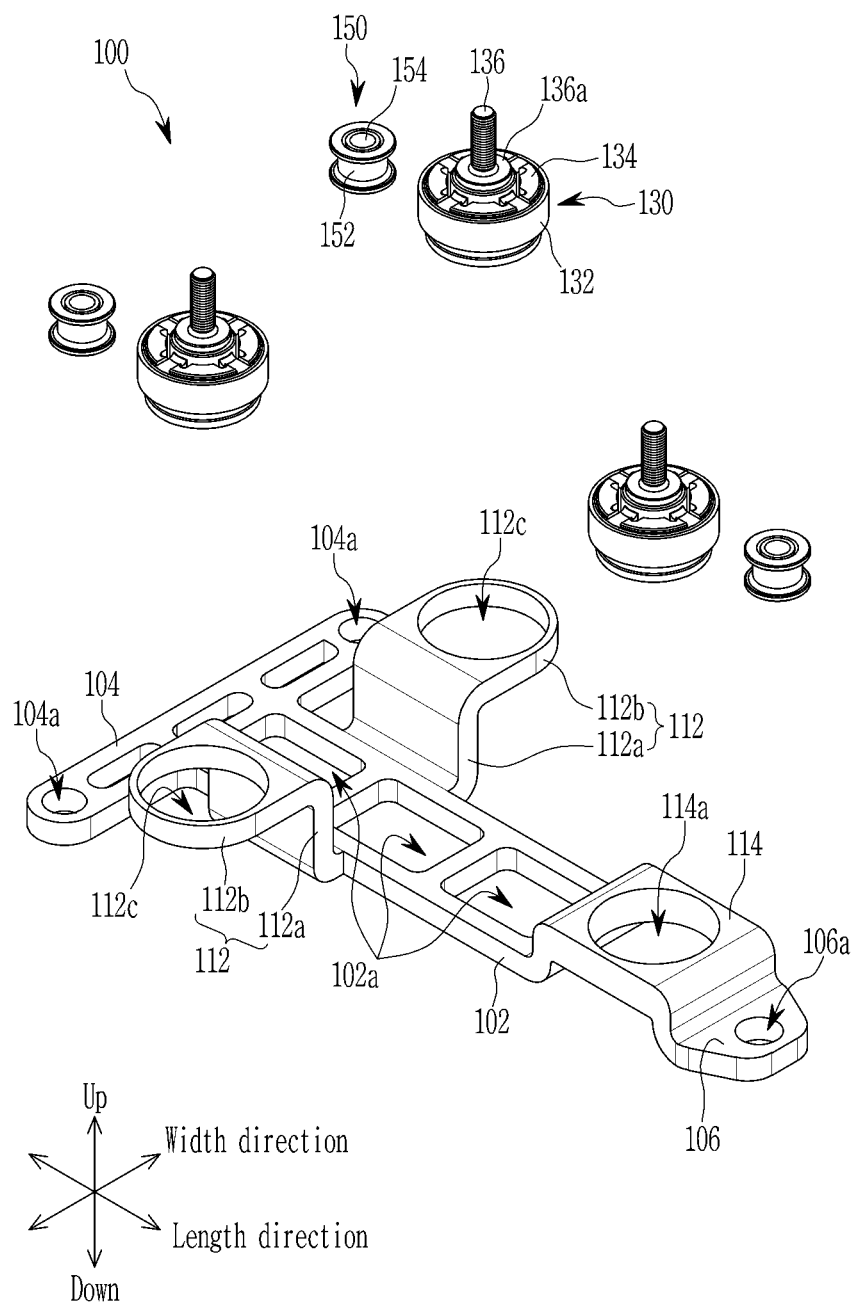
FIG. 5 is an exploded perspective view of a compressor mounting device for a vehicle according to an exemplary embodiment of the present invention.
Figure 6:
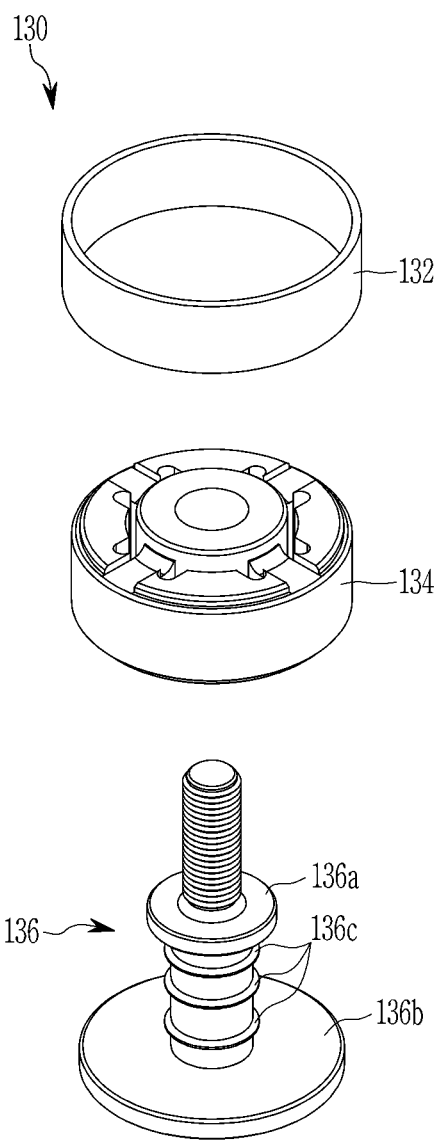
FIG. 6 is an exploded perspective view of a main bush unit applied to a compressor mounting device for a vehicle according to an exemplary embodiment of the present invention.
Figure 8:
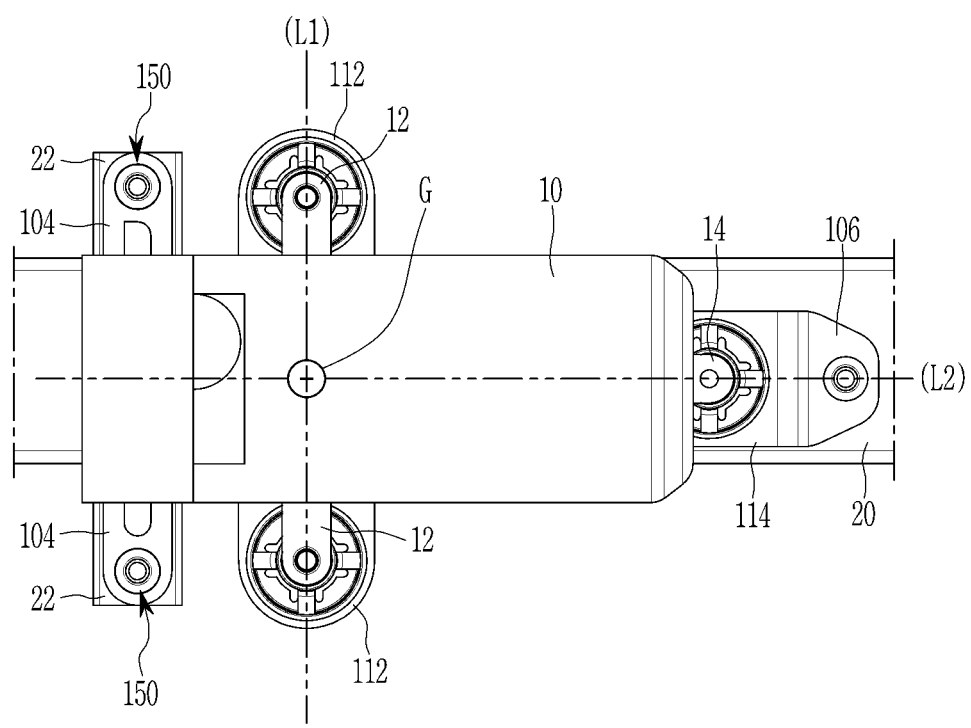
FIG. 8 and FIG. 9 are application state views of a compressor mounting device for a vehicle according to an exemplary embodiment of the present invention.
Figure 9:
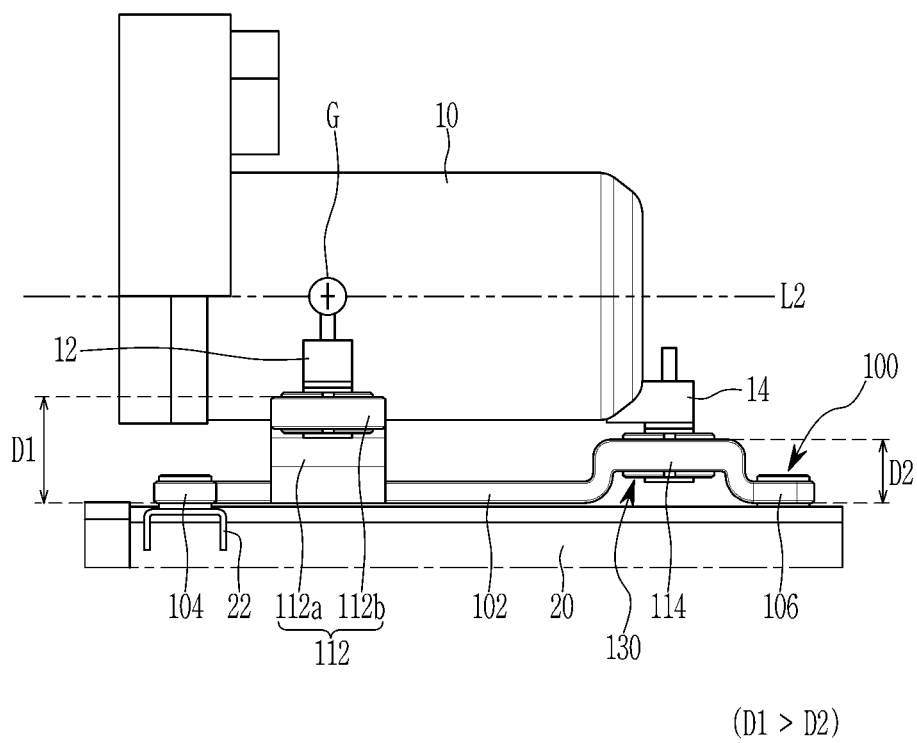

FIG. 1 and FIG. 2 are a perspective view and a lateral view showing a compressor mounted on a vehicle body frame by using a compressor mounting device for a vehicle according to an exemplary embodiment of the present invention, respectively, FIG. 3 is a perspective view of a compressor mounting device for a vehicle according to an exemplary embodiment of the present invention, FIG. 4 is a top plan view of a compressor mounting device for a vehicle according to an exemplary embodiment of the present invention, FIG. 5 is an exploded perspective view of a compressor mounting device for a vehicle according to an exemplary embodiment of the present invention, FIG. 6 is an exploded perspective view of a main bush unit applied to a compressor mounting device for a vehicle according to an exemplary embodiment of the present invention, FIG. 7 is an exploded perspective view of a sub-bush unit applied to a compressor mounting device for a vehicle according to an exemplary embodiment of the present invention, and FIG. 8 and FIG. 9 are application state views of a compressor mounting device for a vehicle according to an exemplary embodiment of the present invention.

Referring to the drawings, a compressor mounting device 100 for a vehicle according to an exemplary embodiment of the present invention is applied to mount a compressor 10 to a vehicle body frame 20.

The compressor mounting device 100, as shown in FIG. 1 to FIG. 5, includes a main body 102, a main bush unit 130, and a sub-bush unit 150.

First, the main body 102 is mounted on the vehicle body frame 20 through first and second frame mounting units 104 and 106 integrally formed on one end and the other end.

In the main body 102, at least one opening hole iota may be formed along a length direction. The opening hole 102a may be applied to reduce a weight of the main body 102.

Here, the first frame mounting unit 104 extends from one end toward both sides of the width direction with respect to the length direction of the main body 102.

The first bush hole 104a may be formed at each of both extended ends of the first frame mounting unit 104 so that the sub-bush unit 150 may be mounted. Also, holes to reduce the weight of the first frame mounting unit 104 may be formed between the first bush holes 104a.

In the present exemplary embodiment, in the second frame mounting unit 106, a second bush hole 106a may be formed to mount the sub-bush unit 150.

Accordingly, the first frame mounting unit 104 is mounted via brackets 22 respectively provided on both sides in the width direction of the vehicle in the vehicle body frame 20 in the state that the sub-bush unit 150 is mounted. The second frame mounting unit 106 is fixedly mounted on the top surface of the vehicle body frame 20 in the state that the sub-bush unit 150 is mounted.

An overall shape of the main body 102 thus constructed is formed with an approximate "T" shape through the first frame mounting unit 104.

On the other hand, the main body 102 may further include first and second compressor mounting units 112 and 114 formed to be protruded upwardly between the first and second frame mounting units 104 and 106 so as to be mounted on first and second lugs 12 and 14 formed in the compressor 10.

The first lug 12 may be formed at both lower portions in the width direction of the compressor 10 by corresponding to a motor head at which the center of gravity of the compressor 10 is located.

The second lug 14 may be disposed on a rear head side of the compressor 10 at a position corresponding to the rotation axis of the compressor 10.

Here, the first compressor mounting unit 112 may be disposed in a position proximate to the first frame mounting unit 104 between the first frame mounting unit 104 and the second frame mounting unit 106 with respect to the length direction of the main body 102.

The second compressor mounting unit 114 may be disposed in a position close to the second frame mounting unit 106 relative to the length direction of the main body 102.

Here, the first compressor mounting unit 112 includes first and second bending parts 112a and 112b.

In the present exemplary embodiment, the first bending part 112a is respectively formed to be bent toward the top at both sides with respect to the width direction of the main body 102.

The second bending part 112b is formed to be bent from the first bending part 112a toward the outside of the width direction of the main body 120.

Here, the third and fourth bush holes 112c and 114a may be respectively formed in the second bending part 112b and the second compressor mounting unit 114 so that the main bush unit 130 is mounted.

Also, the first compressor mounting unit 112, as shown in FIG. 8 and FIG. 9, is formed in the main body 102 at the position corresponding to a center of gravity G of the compressor 10, and may be disposed on the same line as a first imaginary line L1 passing through the center of gravity G in the width direction.

Also, the second compressor mounting unit 114 may be disposed on the same line as a second imaginary line L2 passing through the center of gravity G of the compressor 10 and the rotation axis of the compressor 10.

On the other hand, the second frame mounting unit 106 may be disposed on the same line as the second imaginary line L2.

In addition, the second compressor mounting unit 114 may be formed at a position protruded from the upper surface of the main body 102 toward the top by a predetermined interval.

Here, the first compressor mounting unit 112 may be disposed above the second compressor mounting unit 114 with respect to the lower surface of the main body 102.

In detail, a first length D1 from the lower surface of the main body 102 to the lower surface of the first compressor mounting unit 112 may be set as a length (D1>D2) that is larger than a second length D2 from the lower surface of the main body 102 to the lower surface from the second compressor mounting unit 114.

Accordingly, the first and second compressor mounting units 112 and 114 are integrally formed on the main body 102 with a predetermined height such that the main body 102 has an optimized size and weight.

That is, when the compressor 10 is driven, the vibration generated from the compressor 10 is generated at the center of gravity G of the compressor 10 and the rotation axis of the compressor 10.

In this case, the first and second compressor mounting units 112 and 114 are connected to the compressor 10 through the main bush unit 130 at the position close to the center of gravity G and the rotation axis so as to be disposed close to a vibration source of the compressor 10, thereby the vibration generated from the compressor 10 may be insulated more efficiently.

Accordingly, the main bush unit 130 and the sub-bush unit 150 may be disposed to be balanced outside the compressor 10 through the first and second frame mounting units 104 and 106 and the first and second compressor mounting units 112 and 114 with respect to the center of gravity G and the rotation axis of the compressor 10.

Also, the first and second frame mounting units 104 and 106 and the first and second compressor mounting units 112 and 114, which are integrally formed in the main body 102, are disposed outside the compressor 10, thereby assembly and maintenance of the compressor mounting unit 10 may be secured.

In the present exemplary embodiment, the main bush unit 130 is mounted on the first and second compressor mounting units 112 and 114 so that the vibration generated from the compressor 10 is minimized from being transmitted to the vehicle body frame 20 through the main body 102.

This main bush unit 130 may connect the compressor 10 and the first and second compressor mounting units 112 and 114 via the first and second lugs 12 and 14.

Here, the main bush unit 130, as shown in FIG. 6, may include an outer ring 132, a first insulator 134, and an inner stud 136.

First, the outer ring 132 is pressed into a third or fourth bush hole 112c or 114a formed in the first and second compressor mounting units 112 and 114.

The exterior circumference of the first insulator 134 is vulcanized-bonded on the interior circumference of the outer ring 132.

The first insulator 134 is formed in a bridge shape and a cylinder shape having a penetration hole, and the material thereof may be a rubber material.

Also, the exterior circumference of the inner stud 136 may be vulcanized-bonded on the center of the first insulator 134 and engaged to the first or second lug 12 or 14.

Here, the inner stud 136 includes a first washer part 136a, a second washer part 136b, and a plurality of protrusion parts 136c.

First, the first washer part 136a includes the upper surface supported by the lower end of the first or second lug 12 or 14, and is formed to have a predetermined interval from the upper surface of the first insulator 134.

The second washer part 136b is formed at the lower end of the inner stud 136 to have a predetermined interval from the lower surface of the first insulator 134 at the position spaced apart downwardly from the first washer part 136a.

Here, the first and second washer parts 136a and 136b are formed with a disc shape. In addition, the second washer part 136b may be formed to have a larger area than the first washer part 136a corresponding to the size of the first insulator 134.

The plurality of protrusion parts 136c are formed at the positions spaced apart by a predetermined interval along the length direction of the inner stud 136.

That is, the protrusion parts 136c may be formed between the first washer part 136a and the second washer part 136b to increase the interior circumference and the contact area of the first insulator 134.

Accordingly, when the vibration occurs in the up and down direction from the compressor 10, the lower surface of the first or second lug 12 or 14 selectively contacts the top surface of the first insulator 134, and the top surface of the second washer part 136b selectively contacts the lower surface of the first insulator 134, thereby absorbing the up and down vibrations of the compressor 10.

Also, the remaining vibration except for the vibration generated in the up and down direction from the compressor 10 may be transmitted to the first insulator 134 through the inner stud 136, and may be insulated efficiently by using the elastic force of the first insulator 134.

In the present exemplary embodiment, the inner stud 136 is vulcanized-bonded to the insulator 134 of the main bush unit 130 as an exemplary embodiment, but is not limited thereto.

That is, in the main bush unit 130, an inner ring (not shown) capable of being bolt-engaged at the center may be vulcanized-bonded to the insulator 134 instead of the inner stud 136.

Accordingly, the compressor 10 may be mounted via the bolt to the inner ring (not shown) configured in the main bush unit 130.

In the present exemplary embodiment, the sub-bush unit 150 is mounted on the first and second frame mounting units 104 and 106 to reduce the impact transmitted from the vehicle body frame 20 to the compressor 10 through the main body 102.

That is, the main body 102 is connected to the vehicle body frame 20 through the sub-bush unit 150 through the first and second frame mounting units 104 and 106.

Here, the sub-bush unit 150, as shown in FIG. 7, may include a second insulator 152 and an inner ring 154.

First, the second insulator 152 is vulcanized-bonded on the first and second bush holes 104a and 106a formed in the first and second frame mounting units 104 and 106 with the exterior circumference.

The second insulator 134 has the cylinder shape, and the material thereof may be a rubber material.

Also, the inner ring 154 is vulcanized-bonded on the interior circumference of the second insulator 134 with the exterior circumference. An engaging bolt is inserted into the inner ring 154 to be engaged to the vehicle body frame 20 or the bracket 22.

Accordingly, the main body 102 may be fixed to the vehicle body frame 20 via the sub-bush unit 150 mounted on the first and second frame mounting units 104 and 106.

Meanwhile, in the present exemplary embodiment, the first insulator 134 and the second insulator 152 may be formed with different elastic coefficients.

In addition, the first insulator 134 may be formed with a lower elastic coefficient than the second insulator 152.

That is, the first insulator 134 may be formed with an elastic coefficient that is advantageous for the vibration insulation, and the second insulator 152 may be formed with an elastic coefficient that is advantageous for the impact absorption.

More specifically, the first insulator 134 has the elastic coefficient that is suitable for the isolation of the vibration generated from the compressor 10, which has a relatively low static or dynamic characteristic.

The second insulator 152 has the elastic coefficient that is suitable for absorbing the impact input from the outside when driving the vehicle, which has a relatively high static characteristic or dynamic characteristic.

Accordingly, the first insulator 134 may insulate the vibration generated from the compressor 10, and the second insulator 152 may more efficiently absorb the impact input during the driving through the vehicle body frame 20.

In the configured compressor mounting device 100, the first and second frame mounting units 104 and 106 and the first and second compressor mounting units 112 and 114 are disposed outside the compressor 10, so that the assemblability and serviceability may be improved.

Also, the compressor mounting device 100 may improve the impact absorption and vibration insulation performance and improve the durability of the main and sub-bush units 130 and 150 through the first and second frame mounting units 104 and 106 formed to be balanced with respect to the center of gravity of the compressor 10 to prevent a load from being concentrated on a certain position and the main and sub-bush unit 130 and 150 mounted through the first and second compressor mounting units 112 and 114.

Meanwhile, in describing the compressor mounting device 100 for the vehicle according to an exemplary embodiment of the present invention, the main bush unit 130 and the sub-bush unit 150 are respectively mounted on the first and second frame mounting units 104 and 106 formed in the main body 102 and the first and second compressor mounting units 112 and 114 as an exemplary embodiment, however it is not limited thereto.

That is, the main bush unit 130 may be mounted directly through a bush hole (not shown) formed in the first and second lugs 12 and 14 of the compressor 10.

Further, the sub-bush unit 150 may be mounted directly to the vehicle body frame 20 rather than the first and second frame mounting units 104 and 106.

That is, the main bush unit 130 may be integrally formed with the main body 102 or the compressor 10, and the sub-bush unit 150 may be integrally formed with the main body 102 or the vehicle body frame 20.

As such, the mounting structure of the main bush unit 130 and the sub-bush unit 150 may be freely selected depending on the shape, structure, or mounting position of the compressor 10 and the vehicle body frame 20.

Therefore, when applying the compressor mounting device 100 for the vehicle according to an exemplary embodiment of the present invention, which is configured as described above, the compressor 10 is stably mounted on the vehicle body frame 20 and the external impact is absorbed, thereby protecting the compressor 10, and simultaneously the transmission of the vibration generated from the compressor 10 to the vehicle body may be minimized, and resultantly, the overall NVH performance of the vehicle may be improved by securing the impact absorption and the vibration insulation performance.

Also, the present invention mounts the compressor 10 on the vehicle body frame 20 by applying the main bush unit 130 connected to the compressor 10, the sub-bush unit 150 connected to the vehicle body frame 20, and one main body 102, thereby reducing the manufacturing cost and the weight by minimizing the number of constituent elements.

On the other hand, a compressor mounting device 200 for a vehicle according to another exemplary embodiment of the present invention is described with reference to FIG. 10 and FIG. 11.

Figure 10:
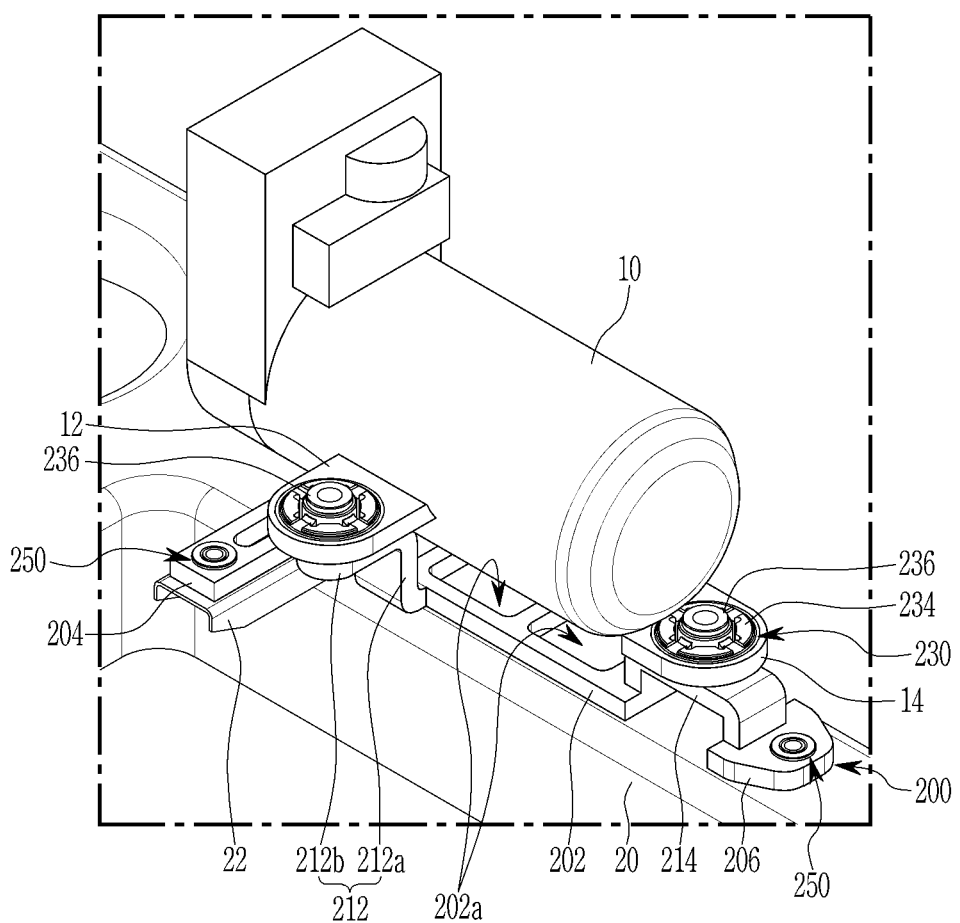
FIG. 10 is a perspective view of a compressor mounting device for a vehicle according to another exemplary embodiment of the present invention.
Figure 11:
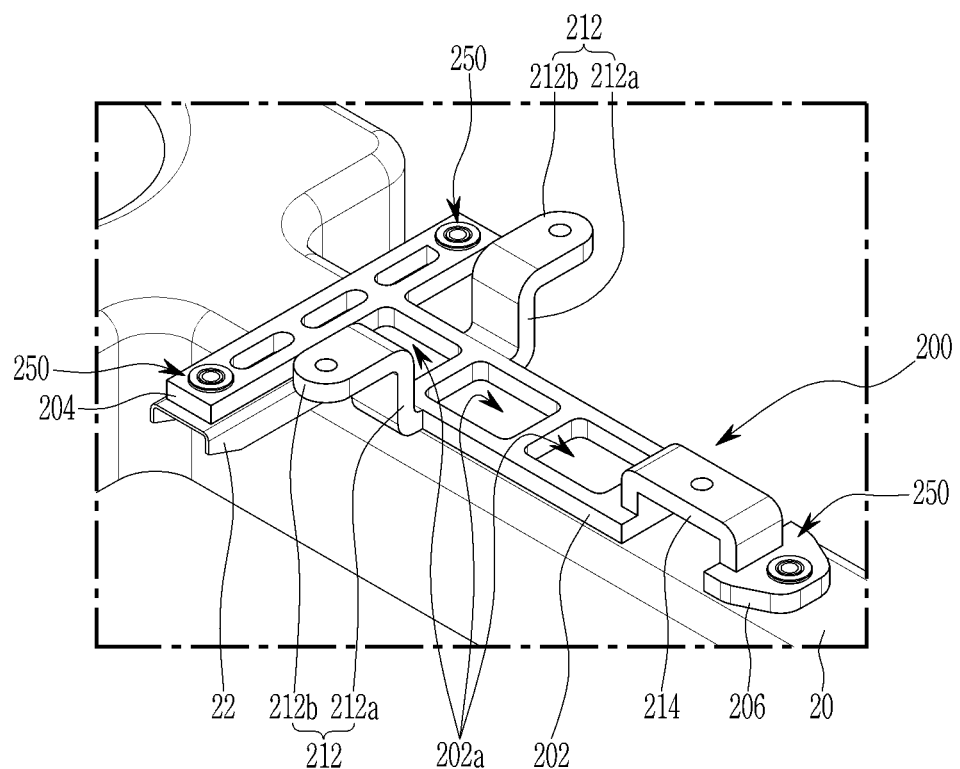
FIG. 11 is a perspective view of a main body applied to a compressor mounting device for a vehicle according to another exemplary embodiment of the present invention.

FIG. 10 is a perspective view of a compressor mounting device for a vehicle according to another exemplary embodiment of the present invention, and FIG. 11 is a perspective view of a main body applied to a compressor mounting device for a vehicle according to another exemplary embodiment of the present invention.

Referring to FIG. 10 and FIG. 11, a compressor mounting device 200 for a vehicle according to another exemplary embodiment of the present invention is applied to mount the compressor 10 on the vehicle body frame 20.

The compressor mounting device 200 includes a main body 202, a main bush unit 230, and a sub-bush unit 250.

First, the main body 202 is mounted on the vehicle body frame 20 through first and second frame mounting units 204 and 206 integrally formed at one end and the other end.

At least one opening hole 202a may be formed along the length direction in the main body 202. The opening hole 202a may be applied to reduce the weight of the main body 202.

Here, the first frame mounting unit 204 extends from one end toward both sides of the width directions with respect to the length direction of the main body 202.

Bush holes (not shown) may be respectively formed at the extended ends of both sides of the first frame mounting unit 204 so that the sub-bush unit 250 is mounted. Also, holes may be formed in the first frame mounting unit 104 to reduce the weight.

In the present exemplary embodiment, the bush frame (not shown) may be formed in the second frame mounting unit 206 to mount the sub-bush unit 250.

Accordingly, the first frame mounting unit 204 is mounted through the brackets 22 respectively provided on both sides in the width direction of the vehicle in the vehicle body frame 20 in the state that the sub-bush unit 250 is mounted. The second frame mounting unit 206 is fixedly mounted on the upper surface of the vehicle body frame 20 in the state that the sub-bush unit 250 is mounted.

On the other hand, in another exemplary embodiment of the present invention, the sub-bush unit 250 is mounted on the first and second frame mounting units 204 and 206 formed in the main body 202 as an exemplary embodiment, however it is not limited thereto. That is, the sub-bush unit 250 may be directly mounted to the vehicle body frame 20 corresponding to the mounting position of the main body 202.

The overall shape of the main body 202 thus constructed is formed with the approximate "T" shape through the first frame mounting unit 204.

On the other hand, the main body 202 may further include first and second compressor mounting units 212 and 214 protruded upwardly between the first and second frame mounting units 204 and 206 so as to be mounted on the first and second lugs 12 and 14 formed on the compressor 10.

The first lug 12 may be respectively formed at both lower portions in the width direction of the compressor 10 corresponding to the motor head in which the center of gravity of the compressor 10 is disposed.

Also, the second lug 14 may be disposed on the rear head side of the compressor 10 at the position corresponding to the rotation axis of the compressor 10.

In these first and second lugs 12 and 14, bush holes (not shown) may be formed, respectively, to mount the main bush unit 230. That is, the main bush unit 230 may be integrally mounted to the compressor 10 via the bush holes (not shown) formed in the first and second lugs 12 and 14, respectively.

Here, the first compressor mounting unit 212 may be disposed at a position close to the first frame mounting unit 204 between the first frame mounting unit 204 and the second frame mounting unit 206 with respect to the length direction of the main body 202.

The second compressor mounting unit 214 may be disposed in the position close to the second frame mounting unit 206 relative to the length direction of the main body 202.

Here, the first compressor mounting unit 212 includes first and second bending parts 212a and 212b.

In the present exemplary embodiment, the first bending part 212a is formed to be bent upwardly from both sides with respect to the width direction of the main body 202.

The second bending part 212b is formed to be bent from the first bending part 212a toward the outside of the width direction of the main body 202.

In addition, the first compressor mounting unit 212 is formed in the main body 202 at the position corresponding to the center of gravity of the compressor 10, and may be disposed on the same line as the imaginary line passing through the center of gravity in the width direction.

The second compressor mounting unit 214 may be disposed on the same line as the imaginary line passing through the center of gravity of the compressor 10 and the rotation axis of the compressor 10.

On the other hand, the second frame mounting unit 206 may be disposed on the same line as the imaginary line passing through the rotation axis of the compressor 10.

In addition, the second compressor mounting unit 214 may be formed at the position protruded upwardly by a predetermined interval from the upper surface of the main body 202.

Here, the first compressor mounting unit 212 may be disposed above the second compressor mounting unit 214 relative to the lower surface of the main body 202.

Accordingly, the first and second compressor mounting units 212 and 214 are integrally formed on the main body 202 with the predetermined height such that the main body 202 has the optimized size and weight.

That is, in the compressor mounting device 200 according to another exemplary embodiment of the present invention, the positions of the first and second frame mounting units 204 and 206 integrally formed in the main body 202 and the first and second compressor mounting units 212 and 214 may be applied the same as an exemplary embodiment described above.

On the other hand, when the compressor 10 is driven, the vibration generated from the compressor 10 is generated at the center of gravity of the compressor 10 and the rotation axis of the compressor 10.

In this case, the first and second compressor mounting units 212 and 214 are connected to the compressor 10 through the main bush unit 230 at the position close to the center of gravity and the rotation axis so as to be disposed close the vibration source of the compressor 10, thereby the vibration generated from the compressor 10 may be insulated more efficiently.

Accordingly, the main bush unit 230 and the sub-bush unit 250 may be disposed to be balanced outside the compressor 10 through the first and second frame mounting units 204 and 206 and the first and second compressor mounting units 212 and 214 with respect to the center of gravity and the rotation axis of the compressor 10.

Also, the first and second frame mounting units 204 and 206 and the first and second compressor mounting units 212 and 214, which are integrally formed in the main body 202, are disposed outside the compressor 10, thereby assembly and maintenance of the compressor mounting unit 200 may be secured.

In the present exemplary embodiment, the main bush unit 230 is mounted through the bush hole formed in the first and second lugs 12 and 14 so that the vibration generated from the compressor 10 is minimized from being transmitted to the vehicle body frame 20 through the main body 202.

The main bush unit 230 may connect the compressor 10 and the first and second compressor mounting units 212 and 214.

Here, when the vibration occurs in the up and down direction from the compressor 10, the upper surface of the first or second compressor mounting units 212 and 214 may be selectively in contact with the lower surface of an insulator 234 provided in the main bush unit 230.

Also, the up and down vibration of the compressor 10 may be absorbed while the bolt mounted through an inner stud 236 mounted on the insulator 234 or the inner ring is in contact with the upper surface of the insulator 234.

In addition, the vibrations except for the vibration of the vertical direction generated from the compressor 10 are transmitted to the insulator 234 through bolts engaged in the inner stud 236 or the inner ring, and may then be insulated efficiently using its own elastic force of the insulator 234.

In the present exemplary embodiment, the sub-bush unit 250 is mounted to the first and second frame mounting units 204 and 206 to reduce the impact transmitted from the vehicle body frame 20 to the compressor 10 through the main body 202.

That is, the main body 202 is connected to the vehicle body frame 20 via the sub-bush unit 250 mounted to the first and second frame mounting units 204 and 206.

Accordingly, the main body 102 may be fixed to the vehicle body frame 20 via the sub-bush unit 250 mounted on the first and second frame mounting units 204 and 206.

Meanwhile, in the present exemplary embodiment, the insulator 234 of the main bush unit 230 and the insulator (not shown) of the sub-bush unit may be formed with different elastic coefficients.

In addition, the insulator 234 of the main bush unit 230 may have a lower elastic coefficient than the insulator of the sub-bush unit 250.

That is, the insulator 234 of the main bush unit 230 may be formed with an elastic coefficient that is advantageous for the vibration insulation, and the insulator of the sub-bush unit 250 may be formed with an elastic coefficient that is advantageous for the impact absorption.

More specifically, the insulator 234 of the main bush unit 230 has an elastic coefficient that is suitable for the vibration isolation generated from the compressor 10, of which the static characteristic or the dynamic characteristic is relatively low.

The insulator of the sub-bush unit 250 has an elastic coefficient that is suitable for absorbing the impact input from the outside during the driving of the vehicle, of which the static characteristic or the dynamic characteristic is relatively high.

Accordingly, the insulator 234 of the main bush unit 230 insulates the vibration generated from the compressor 10, and the insulator of the sub-bush unit 250 may more efficiently absorb the impact input during the driving through the vehicle body frame 20.

The compressor mounting device 200 thus constructed may be improved in assemblability and serviceability by disposing the first and second frame mounting units 204 and 206 and the first and second compressor mounting units 212 and 214 outside the compressor 10.

Also, the compressor mounting device 200 may improve the impact absorption and vibration insulation performance and improve the durability of the main and sub-bush units 230 and 250 through the first and second frame mounting units 204 and 306 formed to be balanced with respect to the center of gravity of the compressor 10 to prevent a load from being concentrated on a certain position and the main and sub-bush units 230 and 250 respectively mounted to the first and second lugs 12 and 14.

Meanwhile, in describing the compressor mounting device 100 for the vehicle according to an exemplary embodiment of the present invention, the main bush unit 230 is mounted to the first and second lugs 12 and 14 formed in the compressor 10 and the sub-bush unit 150 is mounted to the first and second frame mounting units 104 and 106 formed in the main body 102 as an exemplary embodiment, however it is not limited thereto.

That is, the main bush unit 230 may be mounted directly to the first and second compressor mounting units 212 and 214 as described above in an exemplary embodiment.

Also, the sub-bush unit 250 may be mounted directly to the vehicle body frame 20 rather than the first and second frame mounting units 204 and 206.

That is, the main bush unit 230 may be integrally formed with the main body 202 or the compressor 10, and the sub-bush unit 250 may be integrally formed with the main body 202 or the vehicle body frame 20.

As such, the mounting structure of the main bush unit 230 and the sub-bush unit 250 may be freely selected depending on the status such as the shape, the structure, or the mounting position of the compressor 10 and the vehicle body frame 20.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A compressor mounting device for mounting a compressor to a vehicle body frame, the compressor mounting device comprising:
   a main body to be mounted to the vehicle body frame through first and second frame mounting units that are integrally formed to one end of the vehicle body frame and the other end of the vehicle body frame, the main body including first and second compressor mounting units formed to be protruded upwardly between the first and second frame mounting units so as to be mounted to first and second lugs formed in the compressor;
   a main bush unit mounted to the first and second compressor mounting units and connecting the compressor and the first and second compressor mounting units through the first and second lugs to lessen vibration generated from the compressor from being transmitted to the vehicle body frame through the main body; and
   a sub-bush unit mounted to the first and second frame mounting units or the vehicle body frame and connecting the vehicle body frame and the main body to reduce an impact transmitted from the vehicle body frame to the compressor through the main body.

2. The compressor mounting device of claim 1, wherein the first frame mounting unit is located at one end of the main body and extends in a width direction that is perpendicular to a length direction of the main body, the length direction of the main body being a direction between the first and second frame mounting units; and
   a first bush hole is respectively formed at both extended side ends of the first frame mounting unit to mount the sub-bush unit.

3. The compressor mounting device of claim 1, wherein a second bush hole is formed in the second frame mounting unit to mount the sub-bush unit.

4. The compressor mounting device of claim 1, wherein
   the first compressor mounting unit is disposed between the first frame mounting unit and the second frame mounting unit at a position closer to the first frame mounting unit than to the second frame mounting unit; and
   the second compressor mounting unit is disposed at a position closer to the second frame mounting unit than to the first frame mounting unit.

5. The compressor mounting device of claim 1, wherein the first compressor mounting unit comprises:
   a first upward bending part disposed at a first side of the main body and extending away from the main body in an upward direction;
   a second upward bending part disposed at a second side of the main body and extending away from the main body in the upward direction, the second side opposite the first side along a width direction of the main body that is perpendicular to a length direction of the main body, the length direction of the main body being a direction between the first and second frame mounting units;
   a first outward bending part extending from the first upward bending part away from the main body in the width direction; and
   a second outward bending part extending from the second upward bending part away from the main body in the width direction.

6. The compressor mounting device of claim 5, wherein third bush holes are formed in the first and second outward bending parts and wherein a fourth bush hole is formed in the second compressor mounting unit to mount the main bush unit.

7. The compressor mounting device of claim 1, wherein the first compressor mounting unit is formed in the main body at a position corresponding to a center of gravity of the compressor and disposed on the same line as a first imaginary line passing through the center of gravity in a width direction.

8. The compressor mounting device of claim 1, wherein the second compressor mounting unit is disposed on the same line as a second imaginary line passing through a center of gravity of the compressor and a rotation axis of the compressor.

9. The compressor mounting device of claim 8, wherein the second frame mounting unit is disposed on the same line as the second imaginary line.

10. The compressor mounting device of claim 1, wherein the first compressor mounting unit is disposed above the second compressor mounting unit with respect to a lower surface of the main body.

11. The compressor mounting device of claim 1, wherein an opening hole is formed in the main body along a length direction, the length direction of the main body being a direction between the first and second frame mounting units.

12. The compressor mounting device of claim 1, wherein the main body is formed with a "T" shape through the first frame mounting unit.

13. The compressor mounting device of claim 1, wherein the first frame mounting unit is mounted through a bracket provided on the vehicle body frame.

14. A compressor mounting device for mounting a compressor to a vehicle body frame, the compressor mounting device comprising:
   a main body to be mounted to the vehicle body frame through first and second frame mounting units that are integrally formed to one end of the vehicle body frame and the other end of the vehicle body frame, the main body including first and second compressor mounting units formed to be protruded upwardly between the first and second frame mounting units so as to be mounted to first and second lugs formed in the compressor;
   a main bush unit mounted to the first and second compressor mounting units and connecting the compressor and the first and second compressor mounting units through the first and second lugs to lessen vibration generated from the compressor from being transmitted to the vehicle body frame through the main body; and
   a sub-bush unit mounted to the first and second frame mounting units or the vehicle body frame and connecting the vehicle body frame and the main body to reduce an impact transmitted from the vehicle body frame to the compressor through the main body;
   wherein the main bush unit comprises:
      an outer ring mounted to the first and second compressor mounting unit;
      a first insulator with an exterior circumference vulcanized-bonded to an interior circumference of the outer ring; and
      an inner stud with the exterior circumference vulcanized-bonded to the center of the first insulator and engaged to the first or second lug.

15. The compressor mounting device of claim 14, wherein the inner stud comprises:
   a first washer part with an upper surface supported by a lower end of the first or second lug and formed to have a predetermined interval from the upper surface of the first insulator;
   a second washer part formed to be spaced apart from a lower surface of the first insulator at a position separated downwardly from the first washer part; and
   a protrusion part formed between the first washer part and the second washer part to increase a contact area with an interior circumference of the first insulator.

16. The compressor mounting device of claim 15, wherein the second washer part is formed with a wider area than the first washer part corresponding to a size of the first insulator.

17. The compressor mounting device of claim 14, wherein the sub-bush unit comprises:
   a second insulator mounted to the first and second frame mounting units; and
   an inner ring with an exterior circumference vulcanized-bonded to an interior circumference of the second insulator.

18. The compressor mounting device of claim 17, wherein the first insulator and the second insulator are formed with different elastic coefficients.

19. The compressor mounting device of claim 17, wherein the first insulator is formed with a lower elastic coefficient than that of the second insulator.

20. A compressor mounting device for mounting a compressor to a vehicle body frame, the compressor mounting device comprising:
   a main body to be mounted to the vehicle body frame through first and second frame mounting units that are integrally formed to one end of the vehicle body frame and the other end of the vehicle body frame and including first and second compressor mounting units formed to be protruded upwardly between the first and second frame mounting units so as to be mounted to first and second lugs formed in the compressor;
   a main bush unit mounted to the first and second lugs and connecting the compressor and the first and second compressor mounting units to lessen a vibration generated from the compressor from being transmitted to the vehicle body frame through the main body; and
   a sub-bush unit mounted to the first and second frame mounting units or the vehicle body frame and connecting the vehicle body frame and the main body to reduce an impact transmitted from the vehicle body frame to the compressor through the main body.

* * * * *